United States Patent
Hoyer et al.

(10) Patent No.: US 10,404,682 B2
(45) Date of Patent: Sep. 3, 2019

(54) PROOF OF PRESENCE VIA TAG INTERACTIONS

(71) Applicant: ASSA ABLOY AB, Stockholm (SE)

(72) Inventors: Philip Hoyer, Richmond (GB); Mark Robinton, Eden Prairie, MN (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 14/772,995

(22) PCT Filed: Mar. 6, 2014

(86) PCT No.: PCT/IB2014/000843
§ 371 (c)(1),
(2) Date: Sep. 4, 2015

(87) PCT Pub. No.: WO2014/140814
PCT Pub. Date: Sep. 18, 2014

(65) Prior Publication Data
US 2016/0021091 A1 Jan. 21, 2016

Related U.S. Application Data

(60) Provisional application No. 61/794,371, filed on Mar. 15, 2013, provisional application No. 61/794,447, filed on Mar. 15, 2013.

(51) Int. Cl.
*H04L 29/06* (2006.01)
*H04L 9/32* (2006.01)
(Continued)

(52) U.S. Cl.
CPC ........ *H04L 63/083* (2013.01); *G06F 16/9566* (2019.01); *H04L 9/321* (2013.01);
(Continued)

(58) Field of Classification Search
None
See application file for complete search history.

(56) References Cited

U.S. PATENT DOCUMENTS 6,961,000 B2  11/2005  Chung
7,295,114 B1*  11/2007  Drzaic ................... A62B 99/00
                                                  235/385
(Continued)

FOREIGN PATENT DOCUMENTS

AU  2014229568 A1  10/2015
AU  2014229575 A1  10/2015
(Continued)

OTHER PUBLICATIONS

Thorsten Staake, Frederic Thiesse, Elgar Fleisch, "Extending the EPC Network—The Potential of RFID in Anti-Counterfeiting," SAC '05, Mar. 13-17, 2005, pp. 1607-1612.*
(Continued)

*Primary Examiner* — Kaveh Abrishamkar
(74) *Attorney, Agent, or Firm* — Schwegman Lundberg & Woessner, P.A.

(57) ABSTRACT

A system and method for determining presence information for mobile devices (104) are disclosed. Specifically, the presence information for a mobile device (104) can be determined based on whether or not the mobile device (104) is having a unique interaction with a smart tag (108). If a unique interaction is detected, then the mobile device (104) can be said to be within the presence of the smart tag (108) and the location or presence information for the mobile device (104) can be correlated to location information known for the smart tag (108).

22 Claims, 5 Drawing Sheets

(51) Int. Cl.

| | |
|---|---|
| *G06F 16/955* | (2019.01) |
| *H04W 12/10* | (2009.01) |
| *H04W 12/06* | (2009.01) |
| *H04L 29/12* | (2006.01) |
| *H04W 12/08* | (2009.01) |
| *H04L 29/08* | (2006.01) |
| *H04W 4/80* | (2018.01) |

(52) U.S. Cl.
CPC .......... *H04L 9/3247* (2013.01); *H04L 61/609* (2013.01); *H04L 63/0492* (2013.01); *H04L 63/0823* (2013.01); *H04L 67/02* (2013.01); *H04W 12/06* (2013.01); *H04W 12/08* (2013.01); *H04W 12/10* (2013.01); *H04L 63/12* (2013.01); *H04L 2209/805* (2013.01); *H04W 4/80* (2018.02)

(56) References Cited

U.S. PATENT DOCUMENTS

| | | | |
|---|---|---|---|
| 7,942,312 B2 | 5/2011 | van Ingen | |
| 7,965,184 B1 | 6/2011 | Nichols et al. | |
| 8,074,271 B2* | 12/2011 | Davis | G06F 21/31 |
| | | | 726/16 |
| 8,285,211 B2 | 10/2012 | Wang et al. | |
| 8,344,853 B1* | 1/2013 | Warner | G06K 19/07309 |
| | | | 340/10.1 |
| 8,429,409 B1 | 4/2013 | Wall et al. | |
| 8,880,027 B1 | 11/2014 | Darringer | |
| 9,406,046 B2 | 8/2016 | Kawaguchi et al. | |
| 9,681,302 B2 | 6/2017 | Robinton et al. | |
| 9,685,057 B2 | 6/2017 | Robinton et al. | |
| 9,703,968 B2 | 7/2017 | Hoyer et al. | |
| 9,825,941 B2 | 11/2017 | Hoyer | |
| 9,860,236 B2 | 1/2018 | Hoyer et al. | |
| 2004/0093045 A1 | 5/2004 | Bisbee et al. | |
| 2005/0061875 A1 | 3/2005 | Zai et al. | |
| 2006/0230276 A1 | 10/2006 | Nochta | |
| 2006/0277061 A1 | 12/2006 | Revanur et al. | |
| 2007/0052517 A1 | 3/2007 | Bishop et al. | |
| 2007/0106892 A1* | 5/2007 | Engberg | G06Q 20/02 |
| | | | 713/168 |
| 2007/0180493 A1 | 8/2007 | Croft et al. | |
| 2008/0069347 A1 | 3/2008 | Brown et al. | |
| 2008/0122584 A1 | 5/2008 | Itasaki et al. | |
| 2009/0055597 A1 | 2/2009 | Robles | |
| 2009/0108063 A1 | 4/2009 | Jain et al. | |
| 2009/0240946 A1 | 9/2009 | Yeap et al. | |
| 2010/0007466 A1 | 1/2010 | Shoarinejad et al. | |
| 2010/0079237 A1 | 4/2010 | Falkk et al. | |
| 2010/0299527 A1 | 11/2010 | Thenmozhi et al. | |
| 2011/0025458 A1 | 2/2011 | Shahriar et al. | |
| 2011/0074552 A1 | 3/2011 | Norair et al. | |
| 2011/0201270 A1 | 8/2011 | Perkins et al. | |
| 2011/0249682 A1 | 10/2011 | Kean et al. | |
| 2012/0013448 A1 | 1/2012 | Baranowski | |
| 2012/0159105 A1 | 6/2012 | Von Behren et al. | |
| 2012/0207305 A1 | 8/2012 | Gallo et al. | |
| 2012/0234908 A1 | 9/2012 | Wang et al. | |
| 2012/0265988 A1 | 10/2012 | Ehrensvard | |
| 2013/0039634 A1 | 2/2013 | Deepak | |
| 2013/0061303 A1 | 3/2013 | Hart et al. | |
| 2013/0102252 A1 | 4/2013 | Rasmussen et al. | |
| 2013/0166917 A1 | 6/2013 | Granbery | |
| 2013/0215467 A1 | 8/2013 | Fein et al. | |
| 2013/0222107 A1 | 8/2013 | Herscovitch et al. | |
| 2013/0237148 A1 | 9/2013 | McCann et al. | |
| 2013/0254116 A1 | 9/2013 | Hayshow et al. | |
| 2013/0344808 A1 | 12/2013 | Murray et al. | |
| 2014/0013406 A1 | 1/2014 | Tremlet | |
| 2014/0023195 A1 | 1/2014 | Lee et al. | |
| 2014/0075572 A1 | 3/2014 | Mehring et al. | |
| 2014/0118113 A1* | 5/2014 | Kaushik | H04W 12/12 |
| | | | 340/8.1 |
| 2014/0123056 A1 | 5/2014 | Puranik et al. | |
| 2014/0173708 A1 | 6/2014 | Garlick | |
| 2014/0256251 A1 | 9/2014 | Caceres et al. | |
| 2014/0282974 A1 | 9/2014 | Maher et al. | |
| 2014/0337205 A1* | 11/2014 | Tavares | G06Q 20/204 |
| | | | 705/39 |
| 2014/0357187 A1 | 12/2014 | Ehrensvard | |
| 2015/0103383 A1 | 4/2015 | Dowling et al. | |
| 2015/0208245 A1 | 7/2015 | Robinton et al. | |
| 2015/0363599 A1 | 12/2015 | Hoyer et al. | |
| 2016/0012696 A1 | 1/2016 | Robinton et al. | |
| 2016/0021100 A1 | 1/2016 | Hoyer | |
| 2016/0142210 A1 | 5/2016 | Hoyer et al. | |
| 2016/0205549 A1 | 7/2016 | Hoyer et al. | |
| 2017/0118201 A1 | 4/2017 | Hoyer et al. | |
| 2018/0097797 A1 | 4/2018 | Hoyer et al. | |

FOREIGN PATENT DOCUMENTS

| | | |
|---|---|---|
| CA | 2905522 A1 | 9/2014 |
| CN | 102663591 | 9/2012 |
| EP | 1710764 | 10/2006 |
| EP | 2487629 | 8/2012 |
| EP | 2518657 | 10/2012 |
| EP | 2974219 A2 | 1/2016 |
| EP | 2974220 A2 | 1/2016 |
| EP | 2974222 A2 | 1/2016 |
| WO | WO 2008/028291 | 3/2008 |
| WO | WO 2011/089423 | 7/2011 |
| WO | WO 2012/103584 | 8/2012 |
| WO | WO 2013/034681 | 3/2013 |
| WO | WO 2013/072437 | 5/2013 |
| WO | WO-2014140807 A2 | 9/2014 |
| WO | WO-2014140814 A2 | 9/2014 |

OTHER PUBLICATIONS

U.S. Appl. No. 14/772,011, filed Sep. 1, 2015, Hoyer et al.
U.S. Appl. No. 14/897,708, filed Dec. 11, 2015, Hoyer et al.
"EMV—Integrated Circuit Card Specifications for Payment Systems. Book 2: Security and Key Management," EMVCo, LLC, Jun. 2008, Version 4.2, 177 pages [retrieved from: http://www.iro.umontreal.ca/~salvail/securite/notes2010/EMVv4.2Book2.pdf].
"EPC Radio-Frequency Identity Protocols Generation-2 UHF RFID Specification for RFID Air Interface, Protocol for Communications at 860MHz-960MHz, Version 2.0.0 Ratified," GS1 EPCglobal Inc., Nov. 1, 2013, pp. 1-152 [retrieved from: http://www.gs1.org/sites/default/files/docs/uhfc1g2/uhfc1g2_2_0_0_standard_20131101.pdf].
"NFC Signature Record Type Definition (RTD) Technical Specification," NFC Forum, Nov. 18, 2010, 18 pages [retrieved from: http://members.nfc-forum.org/specs/spec_license].
"Oberthur Technologies partners with HID Global to carry Seos digital keys on NFC SIM cards for mobile access," ASSA ABLOY, Jul. 17, 2013, 1 page [retrieved from: http://www.assaabloy.com/en/com/press-news/news/2013/oberthur-technologies/].
Emms et al. "The Dangers of Verify PIN on Contactless Cards," Computing Science, Technical Report Series, No. CS-TR-1332, May 2012, 14 pages [retrieved from: http://www.cs.ncl.ac.uk/publications/trs/papers/1332.pdf].
Falk et al. "Application of Passive Asymmetric RFID Tags in a High-Assurance Avionics Multi-Domain RFID Processing System," RFID Systems and Technologies (RFID SysTech), 2008 4th European Workshop, Jun. 11, 2008 8 pages [retrieved from: http://ieeexplore.ieee.org/stamp/stamp.jsp?arnumber=05755752].
Kilas et al. "Digital Signatures on NFC Tags Master of Science Thesis," Mar. 18, 2009, 53 Pages [retrieved from: http://web.it.kth.se/~johanmon/theses/kilas.pdf].
Leicher et al. "Smart OpenID: A Smart Card Based OpenID Protocol," IFIP Advances in Information and Communication Technology, 2012, vol. 376, pp. 75-86.
Pearson "Securing the Pharmaceutical Supply Chain with RFID and Public-key infrastructure (PKI) Technologies," Texas Instruments, Jun. 2005, White Paper, 12 pages.
Piramuthu "Lightweight Cryptographic Authentication in Passive RFID-Tagged Systems," IEEE Transactions on Systems, Man, and (56) References Cited

OTHER PUBLICATIONS

Cybernetics: Part C: Applications and Reviews, May 2008, vol. 38, No. 3, pp. 360-376.
Saeed et al. "Off-line NFC Tag Authenticiation," The 7th International Conference for Internet Technology and Secured Transactions, 2012 International Conference for IEEE, Dec. 10, 2012, pp. 730-735.
Saros et al. "A Platform for Pervasiv Infrastructures," Next Generation Mobile Applications, Services and Technologies, 2009, NGMAST '09, Third International Conference on IEEE, Piscataway, NR, USA, Sep. 15, 2009, pp. 83-88.
Tan et al. "A Robust and Secure RFID-Based Pedigree System (Short Paper)," Information and Communications Security Lecture Notes in Computer Science, Jan. 2006, pp. 21-29.
Vassilev et al. "Personal Brokerage of Web Service Access," Security & Privacy, Sep. 2007, vol. 5, No. 5, pp. 24-31.
International Search Report and Written Opinion for International (PCT) Patent Application No. PCT/IB2013/002617, dated Feb. 19, 2014 12 pages.
International Preliminary Report on Patentability for International (PCT) Patent Application No. PCT/IB2013/002617, dated Mar. 19, 2015 8 pages.
International Search Report and Written Opinion for International (PCT) Patent Application No. PCT/IB2013/001949, dated Feb. 25, 2014 15 pages.
International Preliminary Report on Patentability for International (PCT) Patent Application No. PCT/IB2013/001949, dated Jan. 14, 2016 10 pages.
International Search Report and Written Opinion for International (PCT) Patent Application No. PCT/IB2014/001558, dated Nov. 12, 2014 11 pages.
International Preliminary Report on Patentability for International (PCT) Patent Application No. PCT/IB2014/001558, dated Sep. 24, 2015 7 pages.
International Search Report and Written Opinion for International (PCT) Patent Application No. PCT/IB2014/000853, dated Sep. 17, 2014 15 pages.
International Preliminary Report on Patentability for International (PCT) Patent Application No. PCT/IB2014/000853, dated Sep. 24, 2015 10 pages.
International Search Report and Written Opinion for International (PCT) Patent Application No. PCT/IB2014/000812, dated Sep. 18, 2014 13 pages.
International Preliminary Report on Patentability for International (PCT) Patent Application No. PCT/IB2014/000812, dated Sep. 24, 2015 8 pages.
International Search Report and Written Opinion for International (PCT) Patent Application No. PCT/IB2014/000843, dated Sep. 12, 2014 13 pages.
International Preliminary Report on Patentability for International (PCT) Patent Application No. PCT/IB2014/000843, dated Sep. 24, 2015 8 pages.
International Search Report and Written Opinion for International (PCT) Patent Application No. PCT/IB2014/002157, dated Feb. 17, 2015 12 pages.
International Search Report and Written Opinion for International (PCT) Patent Application No. PCT/IB2014/002986, dated Jun. 30, 2015 19 pages.
Official Action for U.S. Appl. No. 14/306,078, dated Jul. 2, 2015 11 pages.
Tan et al., "A Robust and Secure RFID-Based Pedigree System (Short Paper)," Information & Communications Security Lecture Notes in Computer Science; LNCS, Springer, Berlin, Jan. 1, 2006, pp. 21-29.
Official Action for European Patent Application No. 1458165.6, dated Dec. 8, 2016, 9 pages.
Official Action for Australian Patent Application No. 2014229568, dated Feb. 8, 2017, 3 pages.
Official Action for Australian Patent Application No. 2014229575, dated Feb. 7, 2017, 3 pages.
International Preliminary Report on Patentability for International (PCT) Patent Application No. PCT/IB2014/002157, dated Dec. 29, 2016 8 pages.
International Preliminary Report on Patentability for International (PCT) Patent Application No. PCT/IB2014/002986, dated Jan. 26, 2017 14 pages.
Official Action for U.S. Appl. No. 14/426,180, dated Apr. 15, 2016 19 pages.
Official Action for U.S. Appl. No. 14/426,180, dated Sep. 8, 2016 30 pages.
Notice of Allowance for U.S. Appl. No. 14/426,180, dated Feb. 6, 2017 10 pages.
Official Action for U.S. Appl. No. 14/897,708, dated Jan. 9, 2017 16 pages.
Official Action for U.S. Appl. No. 14/772,894, dated Aug. 8, 2016 13 pages.
Official Action for U.S. Appl. No. 14/772,921, dated Dec. 30, 2016 26 pages.
Official Action for U.S. Appl. No. 14/772,011, dated Feb. 10, 2017 8 pages Restriction Requirement.
Official Action for U.S. Appl. No. 14/772,011, dated May 8, 2017 13 pages.
Official Action for U.S. Appl. No. 14/306,078, dated Mar. 1, 2016 11 pages.
Official Action for U.S. Appl. No. 14/306,078, dated Oct. 12, 2016 14 pages.
Notice of Allowance for U.S. Appl. No. 14/306,078, dated Mar. 13, 2017 6 pages.
Notice of Allowance for U.S. Appl. No. 14/772,894, dated Feb. 16, 2017 7 pages.
Fouladgar et al. "A Simple Privacy Protecting Scheme Enabling Delegation and Ownership Transfer for RFID Tags," Journal of Communications, Nov. 2007, vol. 2, No. 6, pp. 6-13.
Notice of Allowance for U.S. Appl. No. 14/772,921, dated Jul. 18, 2017 16 pages.
Official Action for U.S. Appl. No. 14/897,708, dated Aug. 3, 2017 16 pages.
Official Action for U.S. Appl. No. 14/897,708, dated Feb. 2, 2018 18 pages.
Notice of Allowance for U.S. Appl. No. 14/772,011, dated Aug. 24, 2017 11 pages.
Official Action for U.S. Appl. No. 15/308,978, dated Feb. 23, 2018 18 pages.
Official Action for European Patent Application No. 14833596.1, dated Mar. 23, 2018 9 pages.
"U.S. Appl. No. 14/772,011, Preliminary Amendment filed Sep. 1, 2015", 6 pgs.
"U.S. Appl. No. 14/772,011, Response filed Apr. 10, 2017 to Restriction Requirement dated Feb. 10, 2017", 2 pgs.
"U.S. Appl. No. 14/772,011, Response filed Aug. 8, 2017 to Non Final Office Action dated May 8, 2017", 8 pgs.
"U.S. Appl. No. 15/819,799, Preliminary Amendment filed Nov. 21, 2017", 3 pgs.
"U.S. Appl. No. 15/819,799, Restriction Requirement dated Dec. 18, 2018", 7 pgs.
"Australian Application Serial No. 2014229568, Examination Report dated Feb. 8, 2017", 3 pgs.
"Australian Application Serial No. 2014229575, First Examiner Report dated Feb. 7, 2017", 3 pgs.
"European Application Serial No. 14730187.3, Response filed Apr. 29, 2016 to Communication pursuant to Rules 161(2) and 162 EPC dated Oct. 28, 2015", 10 pgs.
"European Application Serial No. 14730579.1, Response filed apr. 27, 2016 to Communication pursuant to Rules 161(2) and 162 EPC dated Oct. 28, 2015", 9 pgs.
Muhammad, Qasim Saeed, et al., "Off-line NFC Tag Authentication", Internet Technology and Secured Transactions. 2012 International Conferece for. IEEE, (Dec. 10, 2012), 730-735.
NFC Forum, "Signature Record Type Definition Technical Specification", NFC Forum, Signature 1.0, NFCForum-TS-Signature_RTD-1.0, [Online] Retrieved from the internet: <URL:http://members.nfc-forum.org/specs/spec_license>, (Nov. 18, 2010), 18 pgs.

(56) References Cited

OTHER PUBLICATIONS

"European Application Serial No. 14730579.1, Communication Pursuant to Article 94(3) EPC dated Apr. 12, 2019", 5 pgs.
"U.S. Appl. No. 15/819,799, Non-Final Office Action dated May 28, 2019", 6 pgs.
"European Application Serial No. 14730187.3, Communication Pursuantto Article 94(3) EPC dated Apr. 8, 2019", 4 pgs.

* cited by examiner

PROOF OF PRESENCE VIA TAG INTERACTIONS

CROSS REFERENCE TO RELATED APPLICATION

This application is a national stage application under 35 U.S.C. 371 of PCT Application No. PCT/IB2014/000843 having an international filing date of Mar. 6, 2014, which designated the United States, which PCT application claimed the benefit of U.S. application Ser. Nos. 61/794,371 and 61/794,447, both filed Mar. 15, 2013, each of which are incorporated by reference in their entirety.

FIELD OF THE DISCLOSURE

The present disclosure is generally directed toward determining presence and more specifically toward determining presence based on interactions with tags.

BACKGROUND

The utilization of presence information has become increasingly important in commerce. Specifically, there are many technologies that attempt to utilize information about a person's presence or a thing's presence to provide or improve a service in connection therewith. As some examples, presence-based advertising, presence-based authentication, presence-based customer service, and the like are becoming commonly-used Current methods of interacting with tags (e.g., Near Field Communications (NFC) tags, Bluetooth tags, RFID tags, etc.) have a limitation where the interaction, typically reading a Universal Resource Locator (URL) from the tag, does not prove that there was a unique interaction with the tag. Whether the data on the tag is copied to another tag, or replayed, the data cannot be distinguished from an actual subsequent read (second tap) of the tag. Accordingly, any technology that attempts to use a person's presence or a thing's presence via their interaction with a tag cannot be trusted since the tag data may be received as a copy or replay of an original interaction with a tag.

SUMMARY

It is, therefore, one aspect of the present disclosure to provide the ability to validate that a tag has, in fact, been uniquely read (e.g., tapped), which proves the user is in the presence of the tag. According to embodiments of the present disclosure, it should be possible in some cases to validate locally (e.g., at the point of tap) that the tap is unique. In other cases, a remote authentication service can be used to validate that the tap is unique. Thus, proof of presence can be determined either locally at the point of tag interaction or remotely with a remote authentication service.

In one embodiment, a tag is provided with the ability to generate a pseudo-random sequence of numbers that can be appended to the tag's response, such as a URL, email address, phone number, etc. The validation of this pseudo-random sequence of numbers can be done by a validation engine which tracks the sequence for each tag and indicates if the tag has generated the next number in the sequence indicating the user has, in fact, interacted with the tag and is, therefore, currently in the presence of the tag. This information can be used to correlate the user's location to a known location of the tag.

In another embodiment, a mobile device, such as a smartphone, is provided with an application that maintains a local database of the tag interactions that have occurred at the mobile device. Each time a Tag Unique Identifier (TAGID) is read from a tag, a counter is also read from the tag. Based on the information contained in a tag response (e.g., a TAGID and counter value), the local application can determine whether the tag response was a unique response or a replay. In particular, the local application can compare the TAGID and counter value against TAGID/counter value combinations contained in its local database of tag interactions to determine whether the TAGID/counter value combination currently received from the tag is contained in the local database. If the TAGID/counter value combination is not in the local database, then the application can determine that the tag response is a unique response and the location of the mobile device can be correlated to the known location of the tag. In a variation of this implementation, the database of tag interactions could be maintained at a remote authentication service. In this variation, the mobile device may send the entire tag response (e.g., the response including the TAGID and counter value) to the authentication service for analysis.

In another embodiment, a mobile device may be required to verify that it is interacting with a previously determined (and authorized tag) at a known location. In this embodiment, the location of the tag could be known and fixed and the mobile device may also provide its location information (e.g., GPS location information, WiFi-based location information, cellular triangulation location information, etc.) to an authentication service. Before the mobile device begins interacting with a tag, the mobile device may be provided with a challenge/response pair issued by an authentication service. This challenge/response pair may be formatted specifically based on the location information provided by the mobile device. Specifically, the authentication service may attempt to identify a tag that has a location closer to the mobile device location than any other deployed tag. The mobile device may then issue a challenge to the tag (e.g., based on information contained in the challenge/response pair received from the authentication service). The tag may respond to the challenge with a response. If the response received from the tag matches the expected response contained in the challenge/response pair, then the mobile device can confirm that it is interacting with an approved tag based on its location and further interactions with the tag will be allowed.

In some embodiments, a method is provided that generally comprises:

receiving, from a smart tag, a data object including a Tag Authentication Cryptogram (TAC) as well as an identifier of the of the smart tag;

analyzing the TAC to determine that the data object was received from the smart tag via a unique interaction between the smart tag and a mobile device;

determining a location of the smart tag based on the identifier of the smart tag; and correlating the location of the smart tag with a location of the mobile device only in response to determining that the data object was received from the smart tag via a unique interaction between the smart tag and the mobile device.

The TAC received from the tag may include a pseudo-randomly generated number, a counter value that increments after every interaction with the tag, a One-Time-Password (OTP), or combinations thereof.

In some embodiments, the data object is received in one or more NFC Data Exchange Format (NDEF) messages.

In some embodiments, the data object is received via a Bluetooth protocol.

In some embodiments, the location of the smart tag corresponds to a geographical location and may be approximated based on an association with another object.

In some embodiments, the determining the location of the smart tag may include: comparing the identifier of the smart tag with a plurality of identifiers stored in an identifier database; matching the identifier of the smart tag with a first identifier from the plurality of identifiers; and determining that the location of the smart tag corresponds to a location associated the first identifier in the identifier database.

The method may also include: storing, in a data structure, the location of the mobile device along with the correlated location of the smart tag; and storing, in the data structure and in association with the stored location of the mobile device, a time at which the data object was at least one of transmitted by the smart tag and received by the mobile device.

It is still another aspect of the present disclosure to provide a system for confirming presence information for mobile device, where the system includes:

a repository of tag identifiers stored with associated location information; and an authentication service configured to receive a data object from a mobile device, the data object including a Tag Authentication Cryptogram (TAC) and an tag identifier exchanged between the mobile device and a smart tag, wherein the authentication service is further configured to analyze the TAC to determine whether the tag identifier was received during a unique interaction between the mobile device and the smart tag and then correlate a location of the mobile device only in response to determining that the tag identifier was received during a unique interaction between the mobile device and the smart tag.

As used herein, the term "correlating" or "correlate" can be understood to include any act of associating or binding (e.g., logically) one object's location with another object's location within a computational system. For instance, a location of a mobile device may be "correlated" with a location of a smart tag within a data structure stored in a database, for example, by entering a location of the mobile device with the same location as that of a smart tag. As another example, location information for a smart tag within a data structure or data cell may be copied and then pasted into location information for a mobile device, thereby "correlating" the location of the mobile device with the location of the smart tag. As still another example, location information for a mobile device within a data structure can be linked or pointed to location information for a smart tag (e.g., via a URL, hyperlink, data pointer, etc.), thereby "correlating" the location of the mobile device with the location of the smart tag. It should be appreciated that any other mechanism of associating one object's location with another object's location within a computational system can also be used to "correlate" the locations of the two objects. It should also be appreciated that one object can have it's location information "correlated" with location information for many other objects at substantially the same time.

The present disclosure will be further understood from the drawings and the following detailed description. Although this description sets forth specific details, it is understood that certain embodiments of the invention may be practiced without these specific details.

DETAILED DESCRIPTION

Embodiments of the present disclosure will be described in connection with interactions between a smart tag and a mobile device. While most of the mobile device, it should be appreciated that embodiments of the present disclosure are not so limited. Indeed, any type of device having a processor and memory capable of performing the functions of the smart tag discussed herein can be utilized without departing from the scope of the present disclosure. For instance, any tag form factor may be used. Examples of such form factors include card-type tags, key fobs, wristbands, smart tags embedded in clothing or other objects, smart watches, stickers, smart phones, laptops, tablets, etc. Furthermore, the mobile device may correspond to a mobile device carried by a user (e.g., to determine a presence or location of a user) or it may be associated with an inanimate object or thing (e.g., to determine a presence or location of a thing). Thus, while embodiments of the present disclosure are described in connection with determining presence information for a user or person, it should be appreciated that embodiments of the present disclosure are not so limited.

Figure 1:
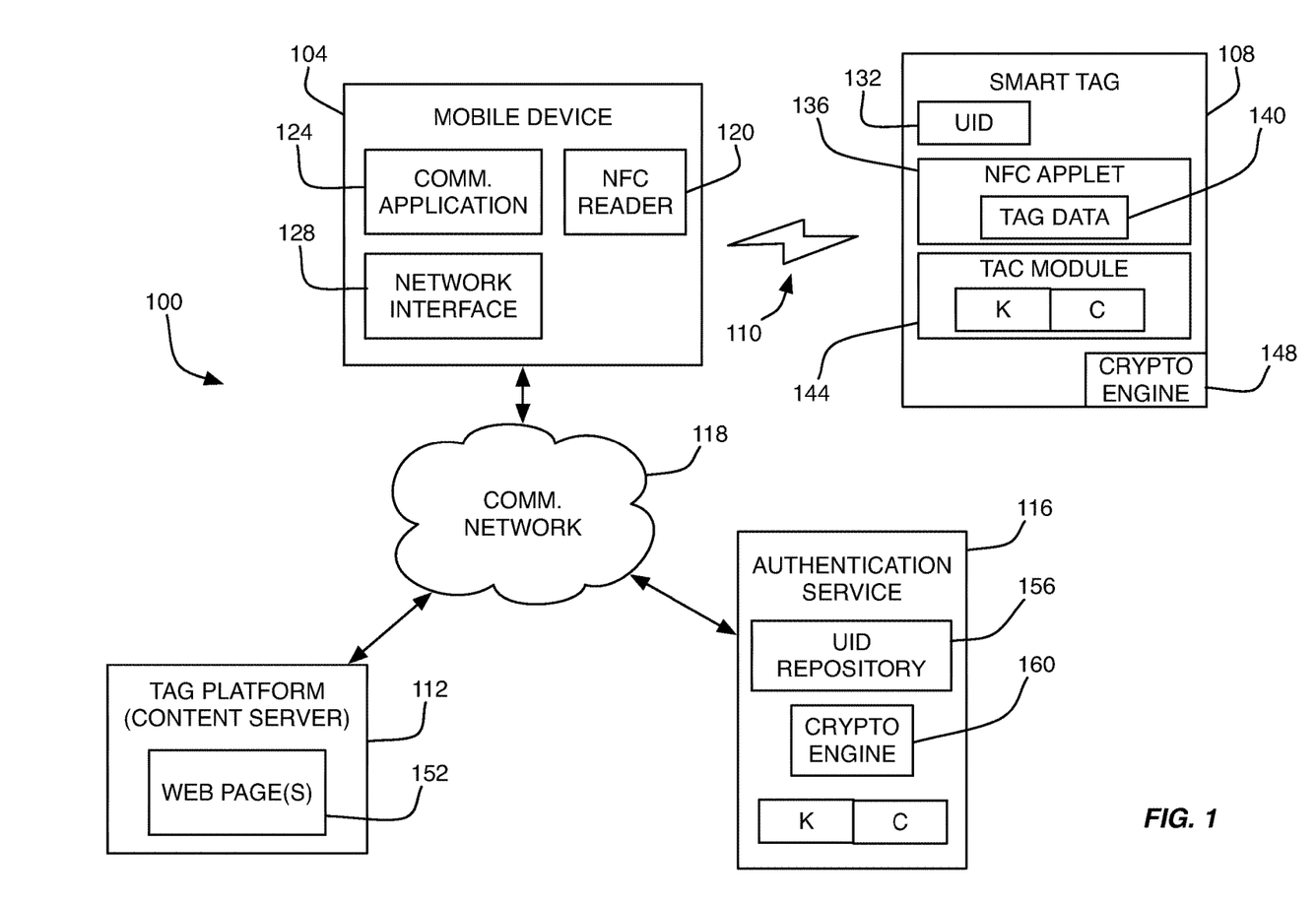
FIG. 1 is a block diagram depicting a communication system in accordance with embodiments of the present disclosure.

With reference initially to FIG. 1, a communication system 100 will be described in accordance with at least some embodiments of the present disclosure. The communication system 100 is shown to include a mobile device 104, a smart tag 108, a tag platform 112, and an authentication service 116, each of which are interconnected or in communication with one another via one or more communication networks 118.

In some embodiments, the mobile device 104 corresponds to a mobile communications device, such as a smartphone or the like. In more specific embodiments, the mobile device 104 may correspond to an NFC-enabled communications device in that the mobile device 104 may be configured to exchange communications with the smart tag 108 via NFC. As shown in FIG. 1, a communications channel 110 may be established directly between the mobile device 104 and the smart tag 108 to enable communications therebetween. In some embodiments, this communications channel 110 corresponds to an NFC or non-galvanic mutual coupling between the mobile device 104 and smart tag 108. In other embodiments, the communications channel 110 corresponds to a direct or indirect wireless communications channel, examples of which may include a Bluetooth channel (e.g., a direct wireless channel), a WiFi/IEEE 802.11N channel (e.g., an indirect channel through a wireless router), etc. In some embodiments, the type of channel 110 used to communicate between the mobile device 104 and smart tag 108 may depend upon the capabilities of the devices; thus, although embodiments of the present disclosure will be described in connection with NFC readers and applets, it should be appreciated that embodiments of the present disclosure are not so limited. Instead, embodiments of the present disclosure contemplate the utilization of a Bluetooth, WiFi, optical, any other type of RF protocols such as ZigBee, Zwave, etc., and/or sound based communication channel 110 between the mobile device 104 and smart tag 108.

As depicted in FIG. 1, the mobile device 104 may comprise an NFC reader 120, a communication application 124, and a network interface 128, among other things. Examples of a mobile device 104 include, without limitation, a smartphone, a tablet, a laptop, a Personal Digital Assistant (PDA), a smart watch, a remote control, a smart vehicle or car, or the like. Although not depicted, the mobile device 104 may also comprise one or more processors (e.g., microprocessors, CPUs, etc.) that are configured to perform certain operations for the mobile device 104 and memory for storing the instructions that are executable by the one or more processors. As an example, the mobile device 104 may have dedicated processors for its NFC functions, communication functions, and other functions (e.g., image-capture functions, GPS functions, etc.). In some embodiments, the components of the mobile device 104 may be connected together via a data bus or similar architecture. The memory of the mobile device 104 may be volatile and/or non-volatile.

The NFC reader 120 may correspond to a collection of components that enable the mobile device 104 to communicate via the communications channel 110 with the smart tag 108. Types of components that may be provided as part of the NFC reader 120 may be executed by a processor of the mobile device 104 to enable the mobile device 104 to operate in one or more of a card emulation mode, a read/write mode, and/or a peer-to-peer mode of operation. In some embodiments, the NFC reader 120 may also comprise a secure element such as a SIM card or an embedded secure element, where NFC data is stored and/or processed in an encrypted or secure fashion.

As noted above, the mobile device 104 may establish the communications channel 110 via non-NFC methods. Thus, mobile device 104 may also include non-NFC communication components (e.g., Bluetooth antennas, Bluetooth drivers, WiFi antennas, Ultra-High Frequency (UHF) communication components, High Frequency (HF) communication components, any variation of Bluetooth components (e.g., drivers or antennas that support Bluetooth, Bluetooth 4, Bluetooth Low Energy (BLE)), ZigBee components, etc.). Furthermore, the non-NFC communications with the smart tag 108 may occur via the network interface 128 and/or the antenna of the NFC reader 120.

The communication application 124 may correspond to one or more of a phone module, email module, Internet browser, messaging module (e.g., SMS, MMS, etc.), or the like that enable the mobile device 104 to communicate with other communication devices via the communication network 118. Another type of communication that may be facilitated by the communication application 124 includes social networking communications.

The network interface 128 may comprise one or more different networks or network types. For instance, the network interface 128 may comprise a cellular network interface that enables the mobile device 104 to interact with a cellular network, which is usually provided by a Mobile Network Operator (MNO). Alternatively or additionally, the network interface 128 may comprise a Bluetooth interface, Infrared interface, etc. The network interface 128 may alternatively or additionally include an 802.11N interface (e.g., Wi-Fi interface), a Universal Serial Bus (USB) port, or any other wired or wireless interface to the communication bus of the mobile device 104.

The smart tag 108 may correspond to any type of device with memory, a processor, and one or more antennas to communicate via the communications channel 110. Non-limiting examples of form factors for the smart tag 108 may include card-type tags, key fobs, wristbands, smart tags embedded in clothing or other objects, smart watches, stickers, smart phones, laptops, tablets, etc. In some embodiments, the smart tag 108 may comprise data storage in the form of a volatile or non-volatile memory as well as a microprocessor or Integrated Circuit (IC). In some embodiments, the smart tag 108 may comprise an Integrated Circuit Card (ICC).

Components of the smart tag 108 are depicted as including a TAGID 132, an NFC applet 136, a Tag Authentication Cryptogram (TAC) module 144, and a cryptographic engine 148, some or all of which may be stored in a secure area of the smart tag's 108 memory. The TAGID 132 of the smart tag 108 may correspond to a static or dynamically-changing string (e.g., alphanumeric string, series of bits, etc.) that identifies the smart tag 108 in a globally unique fashion. As a more specific example, the TAGID 132 may correspond to an identification number assigned to and stored by the smart tag 108 that is uniquely assigned to the smart tag 108 (e.g., to the exclusion of being assigned to any other similar type of smart tag 108).

The NFC applet 136 may correspond to a set of instructions stored on the smart tag 108 that enable the smart tag 108 to generate and share tag data 140 with a mobile device 104 via the communications channel 110. More specifically, the NFC applet 136 may enable the smart tag 108 to receive and understand read requests issued by the mobile device 104 and then respond to the read request in a substantially unique way. In some embodiments, when the smart tag 108 receives a read request from a mobile device 104, the smart tag 108 may invoke its NFC applet 136, which subsequently invokes the TAC module 324. The NFC applet 136 may correspond to an application or portion of executable code that enables the smart tag 108 to emulate functionality of an NFC tag, perhaps in accordance with ISO 7816, the entire contents of which are hereby incorporated herein by reference. The TAC module 144 may correspond to code contained within the smart tag 108 (and possibly written thereto during provisioning) that is capable of generating unique responses to read requests on behalf of the smart tag 108. In some embodiments, the TAC module 144 may comprise a unique cryptographic key K and a counter value C and the TAC module 144 may utilize the cryptographic key K and counter value C along with the assistance of a cryptographic engine 148 to create a data object that can be provided back to the mobile device 104 in response to a read request. Examples of TACs that may be generated by the TAC module 144 include, without limitation, a One-Time-Password (OTP), a pseudo-random number, a counter value, or combinations thereof.

In some embodiments, the cryptographic key K may correspond to a symmetric encryption key of length N bytes that is substantially unique to the smart tag 108 on which it is written. In some embodiments, the cryptographic key K may correspond to at least some of the unique seed value written to the smart tag 108 during provisioning. Likewise, the counter value C may also correspond to a random initial value assigned to the smart tag 108 during provisioning or any incremented value obtained as the smart tag 108 generates responses to devices. In other words, the counter value C may change according to use of the smart tag 108 such that the counter value C is never the same value twice during the life of the smart tag 108; thereby ensuring that the smart tag 108 continues to generate substantially unique responses to each read request. Thus, the unique seed value may correspond to the combination of the cryptographic key K and the counter value C initially written to the smart tag 108 during provisioning.

In other embodiments, the counter value C may correspond to a changeable data part that is not necessarily incremented after each use by the smart tag 108. Instead, the counter value C may correspond to a pseudo-randomly generated value that is computed each time the smart tag 108 is preparing a response. Thus, the counter value C may actually correspond to the output of a pseudo-random number generator as opposed to a value that increments by a predetermined amount (e.g., one, two, three, . . . , ten, etc.) after each use. In either event, the counter value C is intended to change and be substantially unique on a per-transaction basis.

The cryptographic engine 148 is designed to compute a TAC, once invoked by the TAC module 144, based on inputs K and C provided by the TAC module 144. Even more specifically, when the TAC module 144 is invoked by the NFC applet 136, the TAC module 144 may provide the cryptographic key K and the current counter value C (or pseudo-randomly-generated number) to the cryptographic engine 148 which utilizes a cryptographic mechanism that is a hash function that takes an arbitrary block of data (e.g., K and C) and returns a fixed-size bit string, the cryptographic hash value, such that any (accidental or intentional) change to the data will (with very high probability) change the output hash value. Non-limiting examples of cryptographic mechanisms that may be used as the cryptographic engine 148 include MD5, SHA-1, SHA-2, SHA-3, SHA-256, keyed-hash message authentication codes (HMACs), or any other 128, 256, or 512-bit encryption algorithm. The cryptographic engine 148 returns a value based on the inputs K and C that is provided to the NFC applet 136.

In some embodiments, a smart tag 108 may be configured to generate a TAC in response to any number of conditions or triggers. As one example, the smart tag 108 may generate a TAC in response to a mobile device 104 coming into a predetermined proximity (e.g., a read range) of the smart tag 108. In this particular configuration, the smart tag 108 may automatically generate a TAC every time that a mobile device 104 comes within a distance suitable to establish a bidirectional communication link with the smart tag 108. Thus, a new TAC may be automatically generated by the smart tag 108 in response to detecting a mobile device 104 within its communication range, regardless of whether or not the mobile device 104 requests information from the smart tag 108. This means that a certain number of TACs generated by the smart tag 108 may never be transmitted to a mobile device 104; instead, the smart tag 108 will increment or move on to the next TAC when another (or the same mobile device 104) mobile device 104 comes into read range of the smart tag 108 (or the same mobile device 104 exits and re-enters the read range). As another example, the smart tag 108 may be triggered to generate a TAC only in response to receiving a request for authentication from the mobile device 104. In this configuration, the smart tag 108 may wait to generate a TAC unless and until a mobile device 104 is within a read range of the smart tag 108 and the mobile device 104 requests that the smart tag 108 authenticate itself to the mobile device 104. After the request for authentication is received from the mobile device 104, the smart tag 108 may generate and transmit a TAC to the mobile device 104. This particular configuration does not result in the superfluous generation of TACs as compared to the first example described above.

Upon receiving the results from the cryptographic engine 148, the NFC applet 136 formats a response for the mobile device 104 that includes the tag data 140 as well as the results received from the cryptographic engine 148 (e.g., the TAC). The NFC applet 136 then prepares the data object to be provided to the mobile device 104. More particularly, the TAC may correspond to the response-specific data in the data object whereas the tag data 140 and TAGID 132 may correspond to the non-response-specific data. As a non-limiting example, the message transmitted back to the mobile device 104 may be formatted for transmission via NFC, Bluetooth, or some other proximity-based RF communication protocol. Even more specifically, the message transmitted back to the mobile device 104 may comprise one or more NDEF records having the tag data 140, TAGID 132, and TAC.

In some embodiments, the response provided back to the mobile device 104 from the smart tag 108 may be formatted as a URL with the tag data 140, TAGID 132, and TAC. In other embodiments, the response may be in the form of an email address, phone number, or the like that contains some or all of the tag data 140, TAGID 132, and TAC.

The tag data 140 may direct the communication application 124 of the mobile device 104 to communicate with the tag platform (or content server) 112. In particular, the response provided from the smart tag 108 to the mobile device 104 may correspond to a URL or the like. Upon receiving the response, the mobile device 104 may utilize the communication application 124 to request content (e.g., one or more web pages 152) from the tag platform 112. Even more specifically, the URL received from the smart tag 108 may correspond to an address of the web page(s) 152. Thus, the communication application 124 may attempt to retrieve the web page(s) 152 upon receiving the URL from the smart tag 108. As will be discussed in further detail herein, the response provided by the tag platform 112 may be dependent upon the mobile device 104 proving that it is within proximity to the smart tag 108 (e.g., it has the same location as the smart tag 108). In other words, the smart tag 108 is provided with the ability to respond to each read request in a substantially unique fashion, thereby prohibiting replays and copies of previous responses. If the mobile device 104 provides a valid and unique response to the tag platform 112, the tag platform 112 may provide the requested content. For instance, if the content provided by the tag platform 112 is sensitive and can only be viewed at certain locations, then the tag platform 112 will only provide the requested content if the mobile device 104 proves it is within a predetermined distance (e.g., a read range via communications channel 110) of the smart tag 108. Failure to make such a showing will result in the tag platform 112 denying the mobile device's 104 request for content.

Alternatively or additionally, the tag platform 112 may select different content (e.g., web pages 152) for the mobile device 104 depending upon the determined presence of the mobile device 104. This may be done instead of simply denying content based on a replay or copy of a response. For instance, if the mobile device 104 is determined to be at a particular location (due to the mobile device 104 interacting with a particular smart tag 108 having a known and fixed location), then the tag platform 112 will provide appropriate content to the mobile device 104 based on its (and the smart tag's 108) location. If the mobile device 104 is determined to have a different location (e.g., due to interacting with a different smart tag 108), the tag platform 112 may provide different content back to the mobile device 104.

The authentication service 116 may be provided to help ensure that the mobile device 104 is at a particular predetermined location prior to the tag platform 112 providing requested content to the mobile device 104. As such, the authentication service 116 may comprise components that enable the authentication service 116 to analyze responses received at a mobile device 104 during a tag interaction to determine if the responses are unique or replays from previous tag interactions. In particular, the authentication service 116 may be provided with a TAGID repository 156 and a cryptographic engine 160.

The TAGID repository 156 may correspond to a data structure or listing of authentic and deployed smart tags 108 along with information about such tags 108. More specifically, the TAGID repository 156 may contain information that helps identify whether an interaction with a tag 108 corresponds to a unique interaction (e.g., TAC information, TAGID information, etc.). The TAGID repository 156 may also inherently contain or at least reference location information for deployed smart tags 108. In particular, when a smart tag 108 is deployed, the location information for the smart tag 108 may be stored within the TAGID repository 156 in association with the TAGID of the smart tag 108. In this way, the location information of each smart tag 108 can be known and whenever a mobile device 104 interacts with a smart tag 108, the location information for the smart tag 108 interacting with the mobile device 104 can be correlated with location information for the mobile device 104 due to the limited range of the communications channel 110.

The cryptographic engine 160 of the authentication service 116 may be similar or identical to the cryptographic engine 148 of the smart tag 108, thereby enabling the authentication service 116 to check TACs generated by the smart tag 108. More specifically, when the authentication service 116 receives information about a mobile device 104 interacting with a smart tag 108 (e.g., information contained in a tag response provided to the mobile device 104), the authentication service 116 may compare the TAGID received from the mobile device 104 to one or more TAGIDs contained in the TAGID repository 156 to determine whether the smart tag 108 that provided the response to the mobile device 104 is a valid and known smart tag. Additionally, the authentication service 116 may invoke its cryptographic engine 160 to generate an TAC based on its internally-maintained K and C values, which should match the K and C values of a valid smart tag 108. If the TAC generated by the cryptographic engine 160 matches the TAC received from the mobile device 104, then the authentication service 116 can verify that the interaction between the smart tag 108 and mobile device 104 was a unique interaction (e.g., there was no replay of a TAC by the mobile device 104). This information can be used to determine that the mobile device 104 is currently within read range of the smart tag 108 and, therefore, the location of the mobile device 104 can be correlated to the location of the smart tag 108. This correlation can be maintained within the TAGID repository 156 or within a presence database maintained by the tag platform (content server) 112. The newly-determined presence information for the mobile device 104 can also be used by the tag platform (content server) 112 to control the content provided to the mobile device 104. For instance, certain web page(s) 152 may be selectively provided to the mobile device 104 based on the determined location of the mobile device 104.

In some embodiments where the counter value C is incremented at the TAC module 144, the counter value C at the authentication service 116 is incremented for each response it receives for a particular smart tag 108. Thus, the counter values C at each node should maintain a certain amount of synchronization. Alternatively, where a pseudo-random number generator is used by the smart tag 108, a pseudo-random number generator may also be used at the authentication service 116. It should be appreciated that the authentication service 116 may be allowed to verify the validity of an TAC without necessarily generating its own TAC. Instead, the authentication service 116 may maintain a listing of previously-received TACs or counter values within the TAGID repository 156. This list may be kept indefinitely or it may comprise only a fixed number of TACs from previous interactions (e.g., the last 200 TACs generated by a particular smart tag 108). If the authentication service 116 receives an TAC that it has previously received (e.g., that is already found in the list of previously-received TACs), then the authentication service 116 may identify the TAC as invalid and may fail to correlate the location of the mobile device 104 to the smart tag 108.

Although the authentication service 116 is depicted as being separate and distinct from the tag platform (content server) 112 and discussions of the two components are primarily directed toward situations where different entities operate the components, such an implementation is not a requirement for embodiments of the present disclosure. To the contrary, the tag platform (content server) 112 and authentication service 116 may be administered by a common entity or enterprise without departing from the scope of the present disclosure. Additionally, although the TAGID repository 156 (and location information for smart tags 108) is depicted as being stored in the authentication service 116, it should be appreciated that the tag platform (content server) 112 may also maintain location information for tags 108 as well as correlated location information for mobile devices 104 that have interacted with tags 108.

Figure 2:
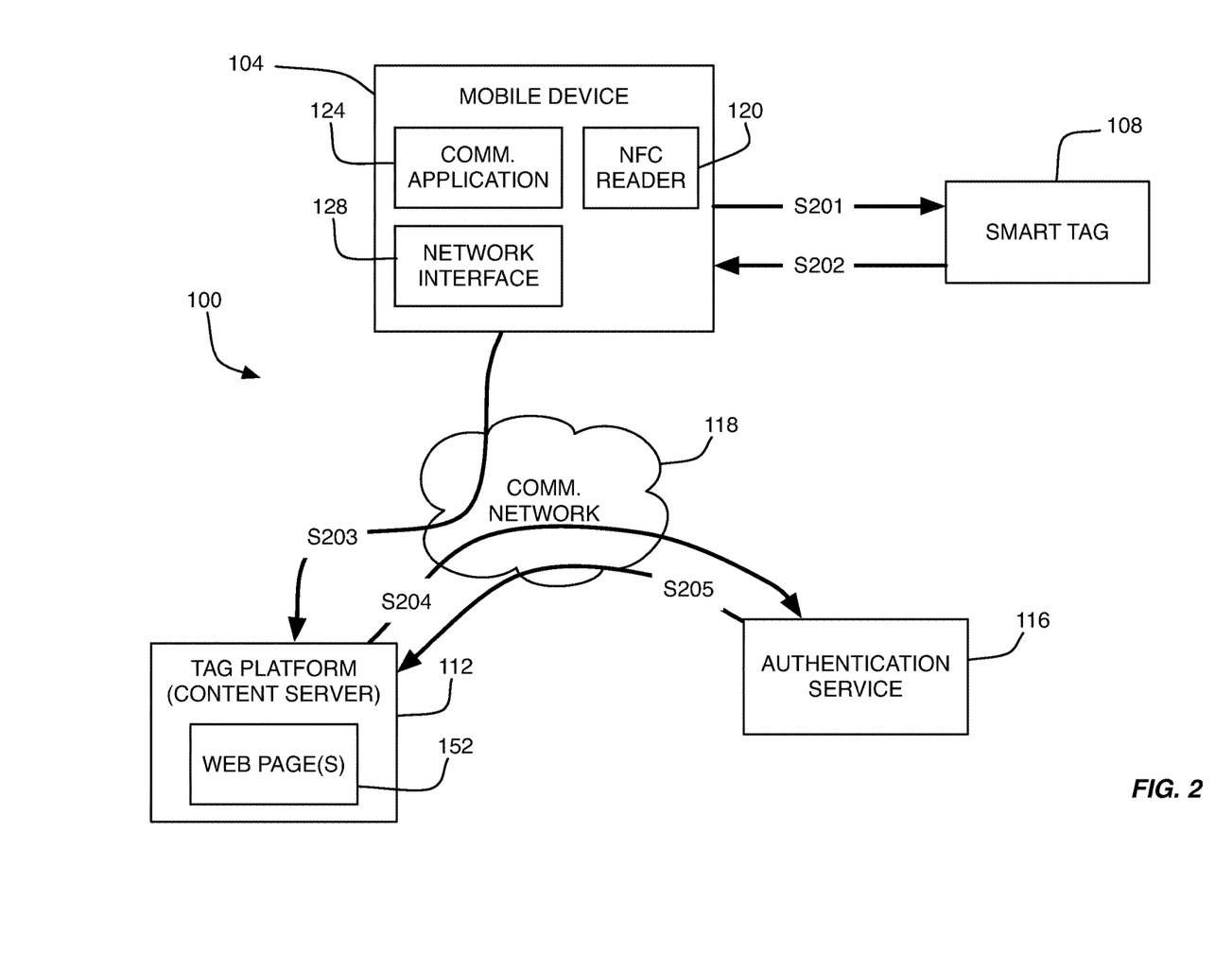
FIG. 2 is a diagram depicting a first method of determining presence in accordance with embodiments of the present disclosure.

With reference now to FIG. 2, a first method of determining presence information for a mobile device 104 or a user/thing associated therewith will be described in accordance with at least some embodiments of the present disclosure. The method begins when the mobile device 104 transmits a read request to the smart tag 108 (step S201). The read request may be transmitted via the communications channel 110 and it may be transmitted before or after a mutual authentication has been performed between the mobile device 104 and smart tag 108.

Upon receiving the read request, the smart tag 108 generates a response thereto and transmits the response back to the mobile device 104 (step S202). The response may be transmitted back to the mobile device 104 via the same communications channel 110 over which the read request was transmitted. In some embodiments, both the read request and response may be transmitted over an NFC communications channel Where NFC is used, some or all of the response may be transmitted in the form of one or more NDEF records. In some embodiments, both the read request and response may be transmitted using a Bluetooth of WiFi communications channel. Combinations of wireless channels may also be used without departing from the scope of the present disclosure. It should be appreciated that the response may include tag data (e.g., a URL, email address, phone number, etc.) or some other data that directs the mobile device 104 to the tag platform (content server) 112. The response may also include information that identifies the smart tag 108 (e.g., a TAGID) as well as interaction-specific information (e.g., an TAC). This information can be provided to the mobile device 104 in one or multiple messages.

In some embodiments, step S201 may be optional and the smart tag 108 may automatically generate a TAC in response to detecting the mobile device 104 within its read range. For instance, if the smart tag 108 detects the mobile device 104 as being within a Bluetooth read range (e.g., up to 100 feet), the smart tag 108 may automatically generate a new TAC. Upon a pairing between the mobile device 104 and smart tag 108, the smart tag 108 may send a data object to the mobile device 104 that includes the newly-generated TAC, a TAGID, and/or other information that is helpful in proving that the mobile device 104 is within the presence of the smart tag 108.

Upon receiving the data object from the smart tag 108 (e.g., in the form of a response or an initially-transmitted message), the mobile device 104 invokes its communication application 124 and issues a request for content to the tag platform (content server) 112 (step S203). In other embodiments, the mobile device 104 may simply send information received from the smart tag 108 to the tag platform 112 (e.g., without necessarily requesting content). Where the mobile device 104 is requesting content, for example by requesting one or more web page(s) 152 from the tag platform (content server) 112, the request may comprise one or more HTTP messages.

When the tag platform (content server) 112 receives the tag information from the mobile device 104, the tag platform (content server) 112 may request the authentication service 116 to confirm that the interaction between the mobile device 104 and smart tag 108 corresponds to a unique interaction (step S204). If the tag platform also implements the authentication service, then the request for confirmation may not necessarily need to traverse the communication network 118.

Upon receiving the information from the tag platform (content server) 112, the authentication service 116 may analyze the information provided from the smart tag 108 to the mobile device 104. In particular, the authentication service 116 may analyze the TAGID of the smart tag 108 as well as the TAC or interaction-specific information provided from the smart tag 108 to the mobile device 104. Based on this analysis, the authentication service 116 provides results of the analysis back to the tag platform (content server) 112, where the information is used to (i) update presence information for the mobile device 104 and/or (ii) condition whether and to what extent content (e.g., a web page 152) is provided to the mobile device 104 (step S205).

If the authentication service 116 verifies that the tag interaction was a unique interaction and the mobile device 104 is currently within a read range of the smart tag 108, then the tag platform (content server) 112 may correlate the location of the mobile device 104 with the known location of the smart tag 108. If the smart tag 108 has been fixed in a particular geographical location, then the mobile device 104 may have its location correlated to the particular geographical location of the smart tag 108. This correlation may occur within a data structure maintained by the tag platform (content server) 112 or within some other data structure (e.g., the TAGID repository 156), which may be maintained by the authentication service 116 or some other entity not depicted. In other embodiments, the location of the smart tag 108 may not actually correspond to a particular geographical location, but instead may correspond to an association of the smart tag 108 with another object. For instance, the smart tag 108 may be fixed or attached to a poster, a patient, a room in which a patient is sitting, a vehicle, a device to repair/control, a store, etc. When the mobile device 104 uniquely interacts with the smart tag 108, it can be confirmed that the mobile device 104 is within the presence of the object to which the smart tag 108 is attached or fixed if the interaction between the mobile device 104 and smart tag 108 is determined to be a unique interaction. Thus, the "location" of the mobile device 104 can be correlated with the object to which the smart tag 108 is attached or fixed rather than correlating the location of the mobile device 104 to a specific geographical location. In other words, the mobile device 104 can be determined to have been within the presence of the object to which the smart tag 108 is attached or fixed and this information may be maintained within a presence database or data structure. Moreover, the presence information can be determined to be current based on when the data object was received at the mobile device 104, based on when the mobile device 104 transmitted the request to the tag platform (content server) 112, or some other action that has a time stamp associated therewith.

As a more specific, but non-limiting example, the smart tag 108 may be incorporated into a wristband of a patient and a healthcare provider may use the mobile device 104 to read the smart tag 108 of the patient. When the mobile device 104/smart tag 108 interaction is determined to be unique, the location of the mobile device 104 and the healthcare provider can be correlated to the smart tag 108 and the patient, without necessarily considering the actual geographical location of the patient. As long as the mobile device 104 sends the unique information obtained from the smart tag 108 within a predetermined time window (e.g., an appointment window), it can be determined that the healthcare provider was in the presence of the patient at the required appointment window since the tag interaction cannot correspond to a replay of previous information obtained from the smart tag 108 earlier (e.g., from a site visit earlier in the day or in a previous day). This particular proof of presence solution is highly useful because many home healthcare providers have a need to verify that a clinician actually comes to a patient's house to provide the care that has been paid for. Methods used today to confirm such activity include the use of caller ID systems (e.g., a phone call placed from the residence of the patient to prove the clinician's presence as the residence) or GPS tracking of the clinician from a phone application. As land lines disappear and the GPS system does not provide enough granularity or non-repudiation, the disclosed proof of presence solution can be used to electronically verify that someone has visited the patient by having their mobile phone 104 interact with the smart tag 108 of a patient.

As another non-limiting example, a plurality of smart tags 108 may be attached to various checkpoints or rooms in a building to facilitate confirmation that a security guard is following a predetermined guard tour route, in the appropriate order, and at the appropriate times. A security guard may perform a guard tour of the building and during the tour be required to read each smart tag 108 with the mobile device 104. As the guard tour is performed, the movement of the guard within the building can be correlated to each smart tag 108 with which the guard uniquely interacts. If the guard properly follows the prescribed guard tour, the mobile device 104 will interact with the appropriate smart tags 108 in the appropriate order and this information can be confirmed by determining each tag interaction is unique and not a replay of a previous interaction from a previous tour. Moreover, if the guard is required to be at each location within a particular time window, the guard's compliance with the guard tour can be confirmed when the guard's mobile device 104 interacts with each smart tag 108 and the information obtained from each smart tag 108 is transmitted back to an authentication service. In some embodiments, the location of the mobile device 104 may be correlated to the location of each smart tag 108, which may correspond to the specific rooms or corridors within and around the building. Thus, a guard's compliance with a guard tour can be continuously confirmed in real-time. This provides particular advantages over prior art guard tour-compliance systems in that any type of mobile device 104 can be used by the guard as opposed to traditional, and more expensive, custom RFID readers. Secondly, the smart tags 108 themselves cannot be closed due to the keys used to generate the TACs.

Yet another non-limiting example is in the context of a sweepstakes/raffle/advertising campaign. Today, sweepstakes are typically managed by having a limited number of physical objects that are issued, for example a raffle ticket. An electronic version of a sweepstakes involves the user being directed to a website where the user is allowed to enter into the contest; however, anyone who knows the URL to the contest website could enter the content, which means that it is extremely difficult to limit the contest participants to only those people present at a particular location (e.g., a trade show, a conference, etc.). With the implementation of the proof of presence concepts disclosed herein, the entry into the sweepstakes/contest can be limited to only those people physically in the presence of the smart tag 108 (e.g., at the location where the entry must take place). Re-use of the URL through refresh or sharing will not result in a valid entry into the sweepstakes/contest.

Still another non-limiting example is in the context of loyalty discounts or coupons. Today, for example, loyalty credits (e.g., buy 10 sandwiches and get one free) are managed through physical punch cards that are modified every time a customer visits a store and makes a purchase. The electronic equivalent of this loyalty coupon involves having a user visit a web page that tracks a "virtual punch card." However, by refreshing the browser or sharing the link, this system can be broken as well. Utilization of the proof of presence concepts disclosed herein helps the retailer ensure that the customer was physically present in the stored when the customer received their additional loyalty points.

Although not depicted, the tag platform (content server) 112 may eventually provide content back to the mobile device 104. For instance, if the mobile device 104 issued a request for a web page, then the requested web page(s) 152 may be provided to the mobile device 104 where they can be displayed and presented to a user of the mobile device 104.

Figure 3:
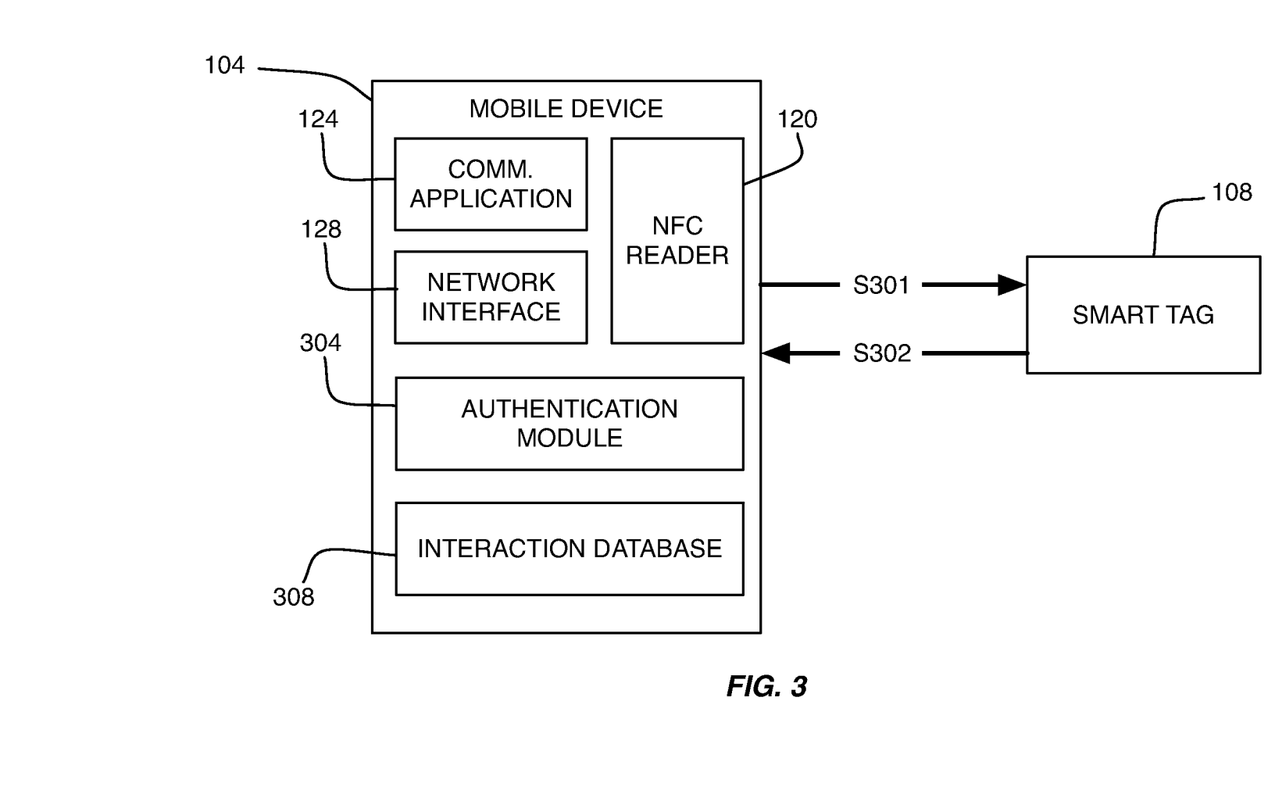
FIG. 3 is a diagram depicting a second method of determining presence in accordance with embodiments of the present disclosure.

With reference now to FIG. 3, a second method of determining presence information for a mobile device 104 or a user/thing associated therewith will be described in accordance with at least some embodiments of the present disclosure. In this particular example, the mobile device 104 is provided with the ability to analyze tag responses to ensure such responses are unique. The mobile device 104 may also be provided with the ability to maintain information about its presence or a history of its tag interactions, which can eventually be correlated to location information.

More specifically, the mobile device 104 is provided with an authentication module 304 that enable the mobile device 104 to perform some or all of the functions discussed in connection with the authentication service 116. The mobile device 104 is also provided with an interaction database 308 that provides the mobile device 104 with the ability to historically track its tag interactions over time. Information from the interaction database 308 can be used by the mobile device 104 to ensure that it continues to have unique tag interactions. Furthermore, the interaction database 308 can be uploaded or provided to a third party, thereby enabling the third party to determine the mobile device's 104 movement over time based on its interaction history.

The method begins when the mobile device 104 issues a read request to the smart tag 108 (step S301). Similar to the read request issued in step S201, the read request issued in step S301 may be transmitted via the communications channel 110. The smart tag 108 may then respond to the read request with a response over the same communications channel 110 (step S302). In some embodiments, the response may contain information that identifies the smart tag 108 (e.g., the tag's TAGID) as well as information that is specific to the current interaction (e.g., a counter value, a TAC, etc.).

When the mobile device 104 receives the response, the mobile device 104 may compare the information contained in the response with some or all of the interactions stored in the interaction database 308. If the information from the current response does not exactly match information from any previous interactions, then the current interaction can be determined to be unique. At this point, the mobile device 104 may determine that it is interacting with a valid and authentic smart tag 108 and additional interactions may occur. Alternatively or additionally, the mobile device 104 may update its own presence or location information and correlate such presence information with the smart tag 108. Again, the mobile device 104 may correlate its geographical location with a known geographical location of the smart tag 104 or the mobile device 104 may simply correlate its presence with an object to which the smart tag 108 is attached or fixed. This information can simply be maintained at the mobile device 104 and/or it can be reported to a third party, such as a tag platform (content server) 112 or authentication service 116.

Figure 4:
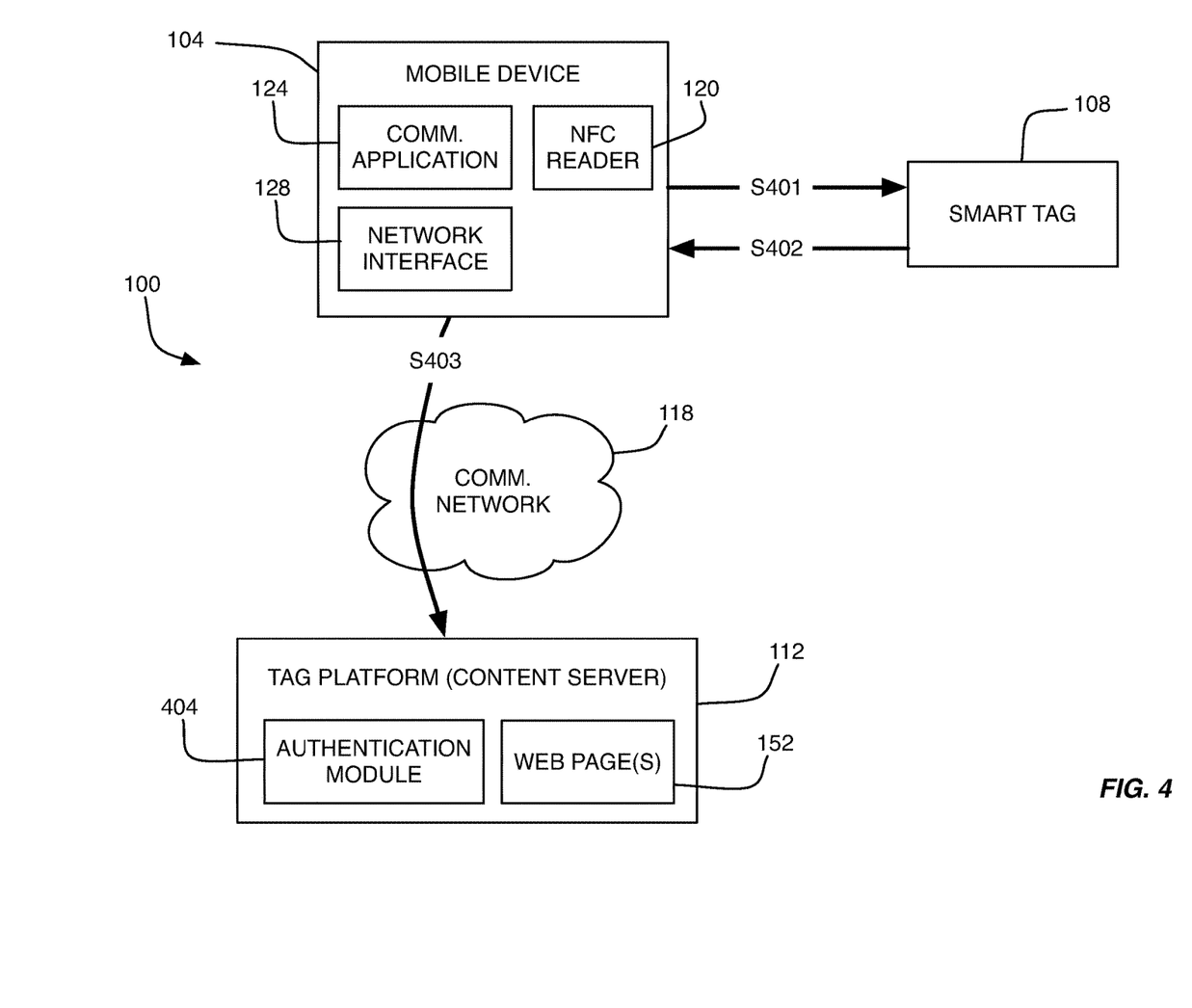
FIG. 4 is a diagram depicting a third method of determining presence in accordance with embodiments of the present disclosure.

With reference now to FIG. 4, a third method of determining presence information will be described in accordance with at least some embodiments of the present disclosure. The method of this example shows a scenario where the tag platform (content server) 112 comprises the authentication module 404. More specifically, the tag platform (content server) 112 is enabled to inherently perform some or all functions of an authentication service 116 (e.g., to determine whether a tag interaction is a unique interaction).

The method begins with the mobile device 104 transmitting a read request to the smart tag 108 (step S401) and the smart tag 108 responding thereto (step S402). The read request and response may both be transmitted over the same communications channel 110 or different communications channels. Moreover, the response may include a TAGID 132, tag data 140, and/or a TAC generated by the smart tag 108.

Some or all of the response received at the mobile device 104 may be provided to the tag platform (content server) 112 via the communication network 118 (step S403). The tag platform (content server) 112 may then invoke its authentication module 404 to determine if the information provided from the smart tag 108 to the mobile device 104 was unique or not. In particular, the authentication module 404 may analyze the TAC and/or TAGID of the response to determine if the smart tag 108 provided a unique response to the mobile device 104, thereby proving that the mobile device 104 is within proximity of the smart tag 108. If the interaction is determined to be unique, then the tag platform (content server) 112 may correlate the location of the mobile device 104 with the location of the smart tag 108. This correlation may be maintained within a data structure of the tag platform or in an external presence database where it can be accessed by other servers and communication devices. The tag platform (content server) 112 may also decide to provide one or more web pages 152 to the mobile device 104 if the interaction is determined to be unique. The web page(s) 152 provided to the mobile device 104 may also vary depending upon the current geographical location of the smart tag 108 and/or the object to which the smart tag 108 is attached/fixed. Of course, if the interaction is not determined to be unique, then the location of the mobile device 104 may not be correlated with the location of the smart tag 108 and/or the web page(s) 152 may not be provided to the mobile device 104.

Figure 5:
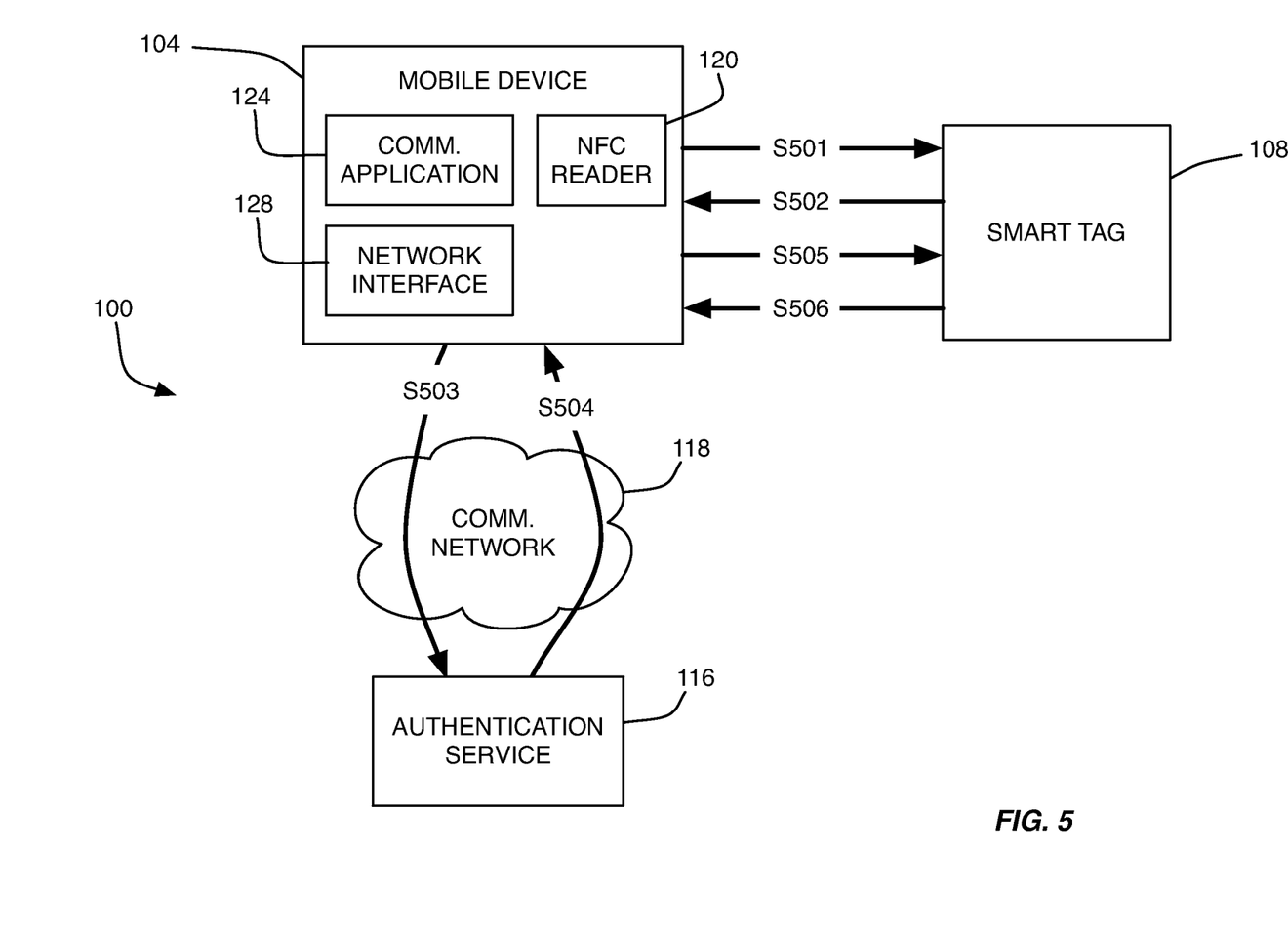
FIG. 5 is a diagram depicting a fourth method of determining presence in accordance with embodiments of the present disclosure.

With reference now to FIG. 5, a fourth method of determining presence information will be described in accordance with at least some embodiments of the present disclosure. The method begins when a mobile device 104 transmits a first read request to a smart tag 108 (step S501). The first read request may correspond to an initial request for authentication information rather than a request for a full response containing tag data 140, a TAGID 132, and an TAC. In other words, the first request may correspond to a request issued before a level of trust has been established between the mobile device 104 and smart tag 108.

In response to the first request, the mobile device 104 may provide a first response (step S502). The first response may be enough information to allow the mobile device 104 to either authenticate the smart tag 108 or begin a process or authenticating the smart tag 108. Specifically, the first response may contain information that directs the mobile device 104 to an authentication service 116 to obtain a challenge/response pair (step S503). The authentication service 116 may determine an appropriate challenge/response pair based on the information contained in the first response of step S502. Once determined, the challenge/response pair is transmitted back to the mobile device 104 (step S504).

Upon receiving the challenge/response pair, the mobile device 104 may generate and send the smart tag 108 a second read request (step S505). The second read request may contain some or all of the challenge contained in the challenge/response pair issued by the authentication service 116. The smart tag 108 may analyze the second read request and generate a second response based on the information contained in the second read request. In particular, the information from challenge may be used by the smart tag 108 to generate the second response, which is subsequently provided to the mobile device 104 (step S506). If the second response received from the smart tag matches the response from the challenge/response pair, then the mobile device 104 can determine that the smart tag 108 is a valid, authentic, and trusted smart tag. Alternatively or additionally, the comparison of the of the second response issued in step S506 with the response from the challenge/response pair may be performed by the authentication service 116. As a further note, the read requests S501, S505 and responses S502, S506 may all be transmitted over a common communications channel 110 directly between the mobile device 104 and smart tag 108. Since there may be a lapse of time between the first read request and second read request, the user of the mobile device 104 may be required to hold the mobile device 104 within a read range of the smart tag 108 for a predetermined amount of time. The progress of the interaction can be depicted to a user of the mobile device 104 via a user output or display, thereby informing the user of how much more time is required for the user to hold the mobile device 104 within proximity of the smart tag 108.

It is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    receiving a data object, generated by a smart tag, that includes both response-specific data and static data that is not response-specific, wherein the response-specific data comprises a Tag Authentication Cryptogram (TAC), and wherein the static data comprises an identifier of the of the smart tag;
    analyzing the TAC to determine that the data object is received from the smart tag via a unique interaction between the smart tag and a mobile device;
    determining a known location of the smart tag based on the identifier of the smart tag;
    receiving a current location of the mobile device as determined by the mobile device separately from using the determined known location of the smart tag; and
    determining whether the mobile device is at a same location as the smart tag based on the known location of the smart tag and the received current location of the mobile device.

2. The method of claim 1, wherein the TAC includes a pseudo-randomly generated number.

3. The method of claim 1, wherein the TAC comprises a counter that increments after every use.

4. The method of claim 1, wherein the data object is received in one or more Near-Field Communications (NFC) Data Exchange Format (NDEF) messages.

5. The method of claim 1, wherein the data object is received via a Bluetooth protocol.

6. The method of claim 1, wherein the known location of the smart tag corresponds to a geographical location, the method further comprising:
    formatting a challenge and response pair based specifically on the location information received from the mobile device; and
    providing the challenge and response pair to the mobile device.

7. The method of claim 1, wherein the known location of the smart tag is approximated based on an association with another object.

8. The method of claim 1, wherein the determining the known location of the smart tag comprises:
    comparing the identifier of the smart tag with a plurality of identifiers stored in an identifier database;
    matching the identifier of the smart tag with a first identifier from the plurality of identifiers; and
    determining that the known location of the smart tag corresponds to a location associated the first identifier in the identifier database.

9. The method of claim 1, further comprising:
   storing, in a data structure, the current location of the mobile device along with the known location of the smart tag; and
   storing, in the data structure and in association with the stored location of the mobile device, a time at which the data object was at least one of transmitted by the smart tag and received by the mobile device.

10. The method of claim 1, wherein determining whether the mobile device is at the same location as the smart tag comprises comparing the known location of the smart tag with the received current location of the mobile device.

11. A system for confirming presence information for mobile devices, the system comprising:
   a repository of tag identifiers stored with associated location information; and
   an authentication service configured to receive a data object from a mobile device, the data object including both response-specific data and static data appended thereto, wherein:
      the response-specific data comprises a Tag Authentication Cryptogram (TAC);
      the static data comprises a tag identifier exchanged between the mobile device and a smart tag;
      the authentication service is further configured to receive a current location of the mobile device as determined by the mobile device separately from using a known location of the smart tag; and
      the authentication service is further configured to analyze the TAC to determine whether the tag identifier is received during a unique interaction between the mobile device and the smart tag and configured to determine whether the mobile device is at a same location as the smart tag based on the received current location of the mobile device and the known location of the smart tag.

12. The system of claim 11, wherein the authentication service is executed by a server that is in communication with the mobile device via a communication network.

13. The system of claim 11, wherein the authentication service is provided on the mobile device.

14. The system of claim 11, wherein the data object is included in at least one of an email message, Short Message Service (SMS) message, and Hyper-Text Transport Protocol (HTTP) message.

15. The system of claim 11, wherein the TAC is compared to previously-received TACs to determine whether the tag identifier was received during a unique interaction between the mobile device and the smart tag.

16. The system of claim 11, wherein the interaction between the mobile device and the smart tag utilizes a proximity-based radio frequency (RF) communication protocol.

17. The system of claim 11, wherein the data object is received in response to a challenge issued by the authentication service and wherein the TAC is compared with a unique expected response to the challenge.

18. The system of claim 17, wherein the TAC is compared with the unique expected response by the mobile device.

19. The system of claim 11, wherein the mobile device corresponds to a Near-Field Communications (NFC)-enabled smart phone.

20. The system of claim 11, further comprising:
   a database containing an access control log, the access control log including location information for one or more mobile devices and, for each of the one or more mobile devices, time information for each time that mobile device received a TAC from a smart tag at a location corresponding to the smart tag.

21. The system of claim 11, wherein the authentication service is further configured to format a challenge and response pair based specifically on the location information received from the mobile device and then provide the challenge and response pair to the mobile device.

22. The system of claim 11, wherein the authentication service is further configured to determine whether the mobile device is at the same location as the smart tag by comparing the known location of the smart tag with the received current location of the mobile device.

* * * * *